US011133675B2

United States Patent
Moore et al.

(10) Patent No.: US 11,133,675 B2
(45) Date of Patent: Sep. 28, 2021

(54) METHOD AND APPARATUS FOR SYNCHRONIZING START-UP OF GRID-FORMING INVERTERS

(71) Applicant: Enphase Energy, Inc., Petaluma, CA (US)

(72) Inventors: Jeremy Omar Moore, Christchurch (NZ); Donald Richard Zimmanck, Sebastopol, CA (US)

(73) Assignee: Enphase Energy, Inc., Petaluma, CA (US)

( * ) Notice: Subject to any disclaimer, the term of this patent is extended or adjusted under 35 U.S.C. 154(b) by 0 days.

(21) Appl. No.: 17/152,744

(22) Filed: Jan. 19, 2021

(65) Prior Publication Data

US 2021/0249860 A1 Aug. 12, 2021

Related U.S. Application Data

(60) Provisional application No. 62/963,669, filed on Jan. 21, 2020.

(51) Int. Cl.
  *H02J 3/14* (2006.01)
  *H02J 3/40* (2006.01)
  *H02J 3/00* (2006.01)

(52) U.S. Cl.
  CPC .............. *H02J 3/14* (2013.01); *H02J 3/001* (2020.01); *H02J 3/40* (2013.01); *H02J 2203/10* (2020.01); *H02J 2300/40* (2020.01); *H02J 2310/56* (2020.01)

(58) Field of Classification Search
  CPC ...... H02J 3/14; H02J 3/40; H02J 3/001; H02J 2203/10; H02J 2300/40; H02J 2310/56
  See application file for complete search history.

(56) References Cited

U.S. PATENT DOCUMENTS

| 10,003,300 B2 | 6/2018 | Bintz et al. |
| 2011/0190958 A1 | 8/2011 | Hirst |
| 2013/0346057 A1* | 12/2013 | Lin .................... H02J 3/00 703/18 |

(Continued)

FOREIGN PATENT DOCUMENTS

CN 108988393 A 12/2018

OTHER PUBLICATIONS

Wikipedia contributors. "Blackstart." Wikipedia, The Free Encyclopedia. Wikipedia, The Free Encyclopedia, Aug. 8, 2021. Web. Aug. 15, 2021. (Year: 2021).*

(Continued)

*Primary Examiner* — Daniel Cavallari
(74) *Attorney, Agent, or Firm* — Moser Taboada

(57) ABSTRACT

Method and apparatus for synchronizing decentralized power conditioner start-up in a distributed resource island system (DRIS). In one embodiment the method comprises determining, by a power conditioner in the DRIS, when a line voltage of the DRIS collapses to zero; starting, by the power conditioner, when the line voltage collapses to zero, a black-start timer, wherein the black-start timer is set to the same amount of time as a plurality of black-start timers corresponding to a plurality of power conditioners of the DRIS; and initiating, by the power conditioner, following expiration of the black-start timer, a black-start.

20 Claims, 3 Drawing Sheets

(56) References Cited

U.S. PATENT DOCUMENTS

2015/0380942 A1   12/2015  Premm et al.
2021/0247732    \*   8/2021  Majumder .......... H02J 13/0004

OTHER PUBLICATIONS

Jin-Young Choi et al., "Black Start and Synchronization of Microgrid Considering Distributed Generation Control." The transactions of The Korean Institute of Electrical Engineers, Jul. 2013, vol. 62, No. 7, pp. 898-904. pp. 898-903; and figures 1-2.
International Search Report and written opinion, dated May 12, 2021, International application No. PCT/US2021/014374.

\* cited by examiner

METHOD AND APPARATUS FOR SYNCHRONIZING START-UP OF GRID-FORMING INVERTERS

CROSS-REFERENCE TO RELATED APPLICATIONS

This application claims benefit of U.S. provisional patent application Ser. No. 62/963,669, entitled "Method and Apparatus for Synchronizing Start-up of Grid-Forming Inverters" and filed Jan. 21, 2020, which is herein incorporated in its entirety by reference.

BACKGROUND OF THE INVENTION

Field of the Invention

Embodiments of the present disclosure relate generally to distributed power generation systems and, more particularly, to a black-start of a distributed power generation system.

Description of the Related Art

In an Electric Power System (EPS), a black-start is the process of restoring power after an outage or start-up of a purely off-grid system with no connection to a power grid. When multiple grid-forming inverters are connected to a large load and powered up, they need to start producing current simultaneously. If they are not well synchronized, the inverters will brown out since they are individually unable to supply enough current to support the load and establish a voltage waveform. The inverters also need to produce current with the same polarity; for inverters having non-polarized connectors, it is possible for the inverters to be physically connected with opposite polarities and cancel out each other's start-up current.

Therefore, there is a need in the art for a method and apparatus for black-start that addresses synchronization of timing and current direction for multiple power conditioners.

SUMMARY OF THE INVENTION

Embodiments of the present invention generally relate to a method and apparatus for synchronizing decentralized start-up of grid-forming inverters in a distributed resource island system (DRIS) substantially as shown in and/or described in connection with at least one of the figures, as set forth more completely in the claims.

These and other features and advantages of the present disclosure may be appreciated from a review of the following detailed description of the present disclosure, along with the accompanying figures in which like reference numerals refer to like parts throughout.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Embodiments of the present invention generally relate to a method and apparatus for a decentralized black-start technique that addresses synchronization of timing and current direction for power conditioners in a distributed resource island system (DRIS). The techniques described herein enable grid-forming power conditioners to black-start into loads up to their maximum rated load in systems not having load relays. Additionally, the techniques described herein enable the power conditioners to black-start into loads with no additional relays and in a decentralized manner, i.e., with no coordination from a gateway or central device, and no additional communication channel between inverters.

In various embodiments where one or more power conditioners attempt a black-start but are unable to support the load, the black-start fails and the voltage collapses to zero. Upon observing the zero line voltage, all connected power conditioners start a timer and, when the timer expires, attempt to restart power conversion. Because all power conditioners observe the voltage collapse event simultaneously, when their timers are set to the same amount they will expire simultaneously to provide a synchronized restart.

In those embodiments where appropriate current polarity needs to be determined, e.g., for power conditioners having non-polarized connectors, rather than initially starting exactly in sync each power conditioner employs a delay algorithm that is based on a polarity confidence score. Those power conditioners which have strong confidence in the current polarity to be generated are likely to start first, and those power conditioners having weaker confidence are likely to start later. This provides the power conditioners starting later an opportunity to observe the voltage coming from the remaining power conditioners, the overall effect being that the power conditioners initially start up slightly spread out so they can see each other ramp. After a few attempts, all power conditioners will have noted which way voltage needs to go and the delays are then scaled down to zero, allowing the power conditioners to start exactly in sync from then on.

Figure 1:
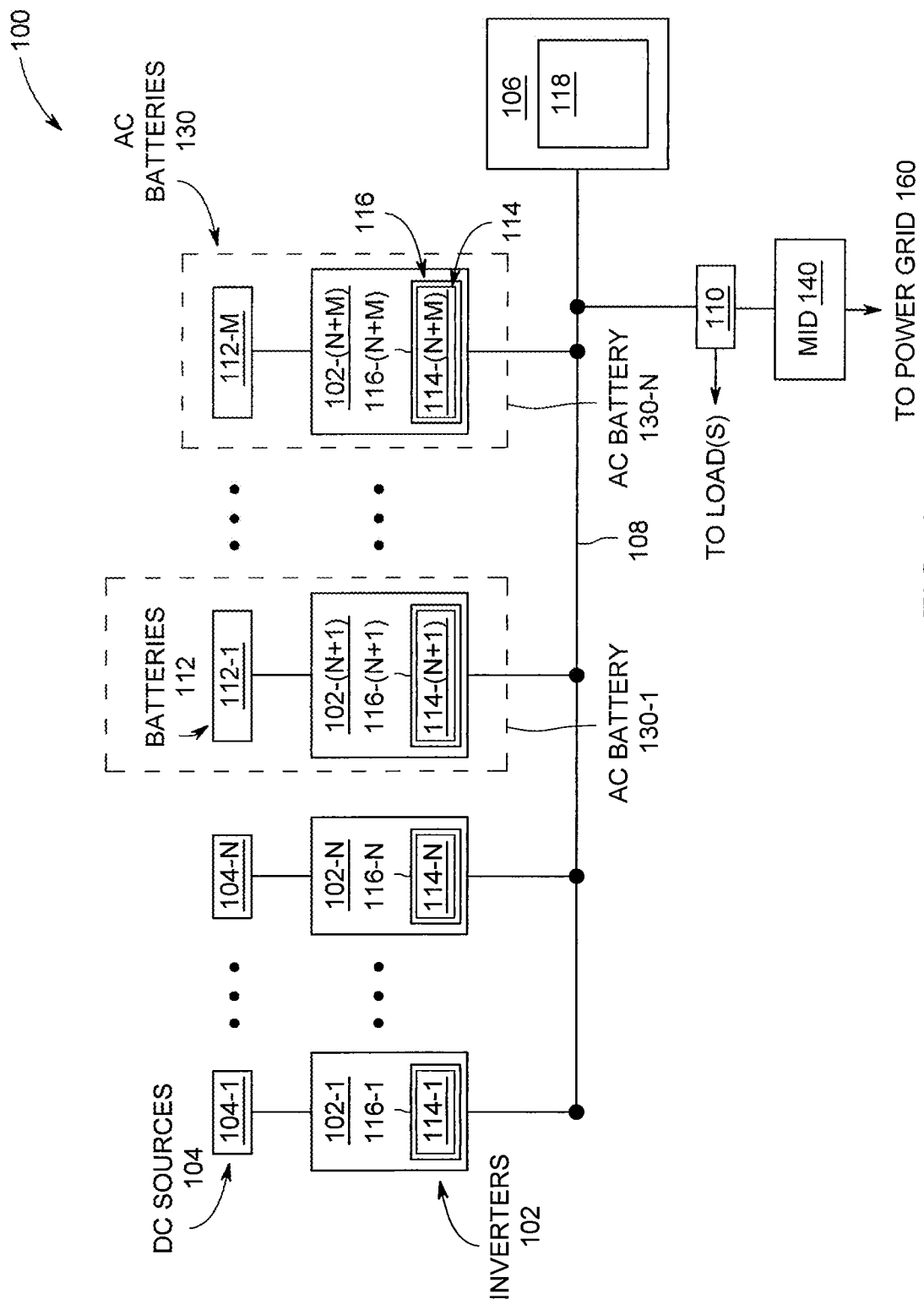
FIG. 1 is a block diagram of a system for power conversion using one or more embodiments of the present invention.

FIG. 1 is a block diagram of a system 100 for power conversion using one or more embodiments of the present invention. This diagram only portrays one variation of the myriad of possible system configurations and devices that may utilize the present invention.

The system 100, which may also be referred to as a microgrid or a distributed resource island system (DRIS), is a distributed power generation system that comprises a plurality of power conditioners 102-1, . . . 102-N, . . . 102-N+M, collectively referred to as power conditioners 102; a plurality of DC power sources 104-1 . . . 104-N, collectively referred to as DC power sources 104; a plurality of energy storage/delivery devices (e.g., batteries) 112-1 . . . 112-M, collectively referred to as energy storage/delivery devices 112; a system controller 106; a bus 108; and a load center 110. The DC power sources 104 may be any suitable DC source, such as an output from a previous power conversion stage, a battery, a renewable energy source (e.g., a solar panel or photovoltaic (PV) module, a wind turbine, a hydroelectric system, or similar renewable energy source), or the like, for providing DC power. In some embodiments, such as the embodiments described with respect to FIG. 1, the DC sources 104 are PV modules and are referred to as "PV modules 104". Although the energy storage/delivery devices 112 may be any suitable device that can store energy and deliver the stored energy for use (e.g., batteries, hydroelectric dams, or the like), in the embodiments described herein with respect to FIG. 1 the energy storage/delivery devices 112 are batteries and are referred to herein as "batteries 112".

The power conditioners 102 are bi-directional grid-forming DC:AC inverters, although in other embodiments the power conditioners 102 may be other types of power converters (e.g., AC-AC matrix converters). In addition to power conversion components, the power conditioners 102 comprise components known in the art (not shown in FIG. 1) to facilitate power conversion and/or the techniques described herein, such as current monitors and voltage monitors for monitoring DC current/voltage and AC current/voltage, transceivers for communicating with other power conditioners and/or the system controller 106 (e.g., via wired techniques such as power line communication (PLC), and/or wireless techniques), and the like.

Each power conditioner 102-1 ... 102-N is coupled to a PV module 104-1 ... 104-N, respectively, in a one-to-one correspondence, although in some other embodiments multiple PV modules 104 may be coupled to one or more of the power conditioners 102. Each power conditioner 102-(N+1) ... 102-(N+M) is coupled to a battery 112-1 ... 112-(M), respectively, in a one-to-one correspondence (although in other embodiments a single battery may be coupled to multiple power conditioners, where each pairing of a power conditioner 102 and a battery 112 forms an "AC battery" 130 (e.g., the battery 112-1 and the power conditioner 102-(N+1) form the AC battery 130-1, and the battery 112-M and the power conditioner 102-(N+M) form the AC battery 130-M). The power conditioners 102 are coupled to the system controller 106 via the bus 108; the bus 108 is further coupled to one or more loads and a power grid 160 (e.g., a commercial grid, one or more other microgrids, or the like) via the load center 110.

The system controller 106 comprises a controller 118 and may communicate with the power conditioners 102 by wireless and/or wired communication (e.g., power line communication (PLC)) for providing operative control and/or monitoring of the power conditioners 102 (e.g., communicating commands to the power conditioners 102, obtaining data (for example regarding the performance of the power conditioners 102) from the power conditioners 102, and the like). Additionally, the power conditioners 102 may communicate with one another by wireless and/or wired communication (e.g., PLC). In some embodiments, the system controller 106 may be a gateway for receiving information from and/or sending information to another device (such as a remote master controller, not pictured) via a communications network, for example via the Internet. In such embodiments, the system controller 106 may communicate information pertaining to the power conditioners 102 (e.g., performance data) to the remote master controller, and/or communicate data received from the remote master controller (e.g., control commands) to one or more of the power conditioners 102.

The system 100 further comprises a microgrid interconnect device (MID) 140, which may also be referred to as an island interconnect device (IID), for determining when to disconnect from/connect to the power grid 160, and for performing the disconnection/connection. For example, the MID 140 may detect a grid fluctuation, disturbance or outage and, as a result, disconnect the system 100 from the power grid 160. Once disconnected from the power grid 160, the system 100 can continue to generate power as an intentional island without imposing safety risks on any line workers that may be working on the power grid 160. The MID 140 comprises a disconnect component (e.g., a contactor or the like) for physically disconnecting/connecting the system 100 to the grid or a larger microgrid. In some embodiments, the MID 140 may additionally comprise an autoformer for coupling the balanced power system 100 to a split-phase load that may have a misbalance in it with some neutral current. In other embodiments, when the system operates only as an island, the MID 140 may not be present.

In some alternative embodiments, the system controller 106 comprises the MID 140 or a portion of the MID 140. For example, the system controller 106 may comprise an islanding module for monitoring the power grid 160, detecting grid failures and disturbances, determining when to disconnect from/connect to the power grid 160, and driving a disconnect component accordingly, where the disconnect component may be part of the system controller 106 or, alternatively, separate from the system controller 106. In other embodiments, such as the embodiment depicted in FIG. 1, the MID 140 is separate from the system controller 106 and comprises a disconnect component as well as a CPU and an islanding module for monitoring the power grid 160, detecting grid failures and disturbances, determining when to disconnect from/connect to the power grid 160, and driving the disconnect component accordingly. In some embodiments, the MID 140 may coordinate with the system controller 106, e.g., using power line communications and/or wireless communication. Thus, the disconnection/connection of the system 100 to the power grid 160 is a controlled process driven by the MID 140.

The power conditioners 102-1 ... 102-N convert the DC power from the PV modules 104 to AC output power and couple the generated output power to the load center 110 via the bus 108. The load center 110 is further coupled to the power 160 grid (e.g., the commercial power grid, a larger microgrid, or the like) as well as to one or more loads (e.g., electrical appliances). The power conditioners 102-(N+1) ... 102-(N+M) are bidirectional converters that can convert AC from the AC bus 108 to DC and store the resulting energy in the corresponding batteries 112-1 ... 112-M, and can convert DC from the corresponding batteries 112-1 ... 112-M to AC that is then coupled to the AC bus 108. As such, the system 100 can generate AC output power during daylight hours via the PV modules 104, store at least a portion of the generated energy in the batteries 112, and continue to generate AC output during the evening hours using the energy stored in the batteries 112. While connected to the power grid 160, the power conditioners 102 may operate in a "power mode" where the grid voltage is used as a reference voltage for synchronizing the output from the power conditioners 102.

In accordance with one or more embodiments of the present invention, each of the power conditioners 102-1 ... 102-(N+M) comprises a corresponding controller 116-1 ... 116-(N+M) having a black-start module 114-1 ... 114(N+M) for providing a decentralized black-start that addresses synchronization of timing and current direction for the power conditioners 102 when the system 100 is islanded and de-energized. The system 100 may be islanded (i.e., not connected to the power grid 160) for a variety of reasons; for example, the MID 140 may disconnect the system 100 from the power grid 160 following a power failure on the power grid 160, a user may manually disconnect the system 100 from the power grid 160 to perform maintenance and/or add components, the system 100 may have been installed and not yet connected to the power grid 160, the system 100 may be configured for no connection to the power grid 160 (i.e., as a purely off-grid system), or the like. In some embodiments, the system 100 may be de-energized when islanded as a result of its load exceeding the system generation capability. In other embodiments, the system 100 may be de-energized when islanded as a result of receiving insufficient input from the sources 104 and 112; for example, in one or more embodiments where the DC sources 104 are PV modules, the system 100 may become de-energized while islanded during the night when the PV modules are not producing any output and if the batteries 112 have insufficient storage to meet the load demand. In still other embodiments, the system 100 may be intentionally de-energized while islanded to conduct routine maintenance or to expand the system 100. Prior to the black-start, one or more loads (such as non-critical loads) may be disconnected from the system 100 as necessary.

While the system 100 is islanded, those power conditioners 102 having sufficient DC input begin initiating a black-start to transition from de-energized to an active grid, either at a soft-grid level or at nominal voltage. When the load is sufficiently large to require multiple power conditioners 102 to activate at the same time, the power conditioners 102 will be synchronized to activate simultaneously as described herein.

As one or more of the power conditioners 102 attempt to activate (e.g., when the input voltage exceeds a threshold) but are individually or in small numbers unable to supply enough current to support the load and establish a voltage waveform, the power conditioner activation will fail and the line voltage collapses to zero. Upon observing the line voltage collapse (i.e., the zero voltage), all connected power conditioners 102 start a timer. Each power conditioner 102 begins activating when the corresponding timer expires; when the timers are all set to the same value, all of the power conditioners 102 are synchronized to activate at the same time.

In those embodiments where appropriate current polarity needs to be determined, e.g., for power conditioners having non-polarized connectors, rather than initially starting exactly in sync each power conditioner 102 adds a randomized delay to its start-up in order to determine current polarity. The randomized delay is based on a confidence score that indicates a confidence level in generating a particular direction of current. This extra delay provides sufficient time, prior to producing current, for the power conditioners 102 to observe the polarity of one another. The delay may be, for example, up to half an AC mains cycle, although other levels of delay may be used.

In one or more embodiments, each power conditioner 102 maintains a confidence score in the range −100 to 100, where a confidence score of 100 means that the power conditioner 102 should definitely start with positive current and a confidence score of −100 means that the power conditioner 102 should definitely start with negative current; if the confidence score is somewhere near zero, the power conditioner 102 will randomly select a direction. In alternative embodiments, other values may be used to establish the confidence score range.

The confidence score is adjusted up or down based on events observed during ramp-up. For example, observing positive voltage from another power conditioner 102 pushes the score up, while observing negative voltage from another power conditioner 102 pushes the score down; a successfully completed ramp-up adds confidence that the current generation is in the right direction, while a failed ramp-up reduces confidence.

Each power conditioner 102 calculates its randomized delay where the delay range is inversely proportional to the confidence score. Those power conditioners 102 which have decided a direction are likely to start first, while those power conditioners 102 which are not sure are likely to start later, thereby providing an opportunity for them to observe the voltage coming from the remaining power conditioners 102. Once the power conditioners 102 reach their maximum confidence level, the additional delay range is reduced to zero so that further black-start attempts are exactly synchronized. The power conditioners 102 are thus "trained" in which current direction to black-start.

Figure 2:
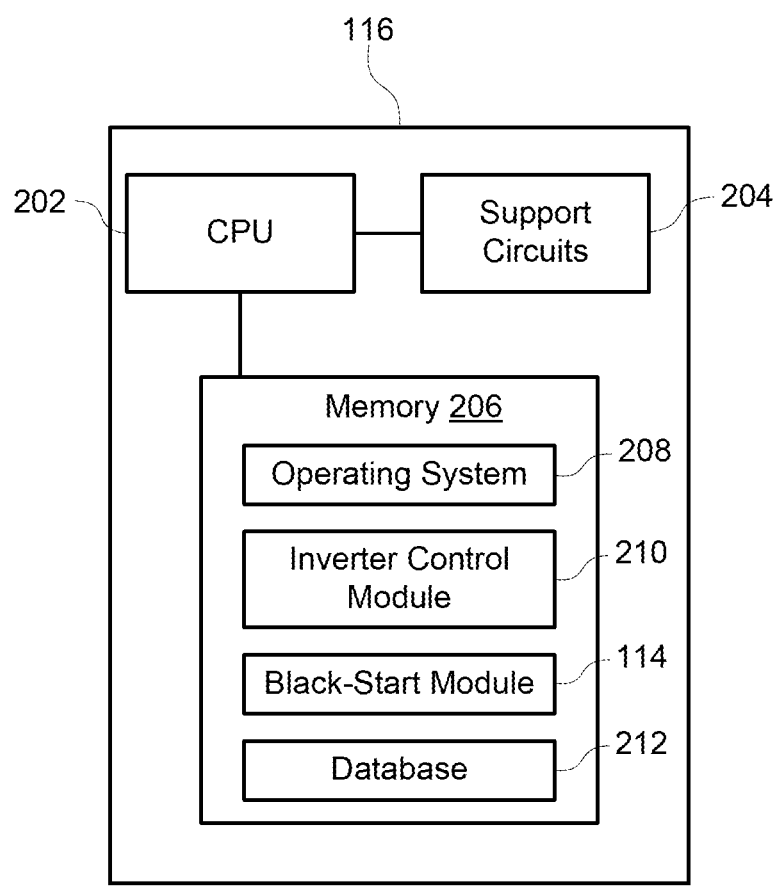
FIG. 2 is a block diagram of a power conditioner controller in accordance with one or more embodiments of the present invention.

FIG. 2 is a block diagram of a power conditioner controller 116 in accordance with one or more embodiments of the present invention. The controller 116 comprises support circuits 204 and a memory (or non-transitory computer readable storage medium) 206, each coupled to a central processing unit (CPU) 202. The CPU 202 may comprise one or more conventionally available microprocessors or microcontrollers; alternatively, the CPU 202 may include one or more application specific integrated circuits (ASICs). The support circuits 204 are well known circuits used to promote functionality of the CPU 202. Such circuits include, but are not limited to, a cache, power supplies, clock circuits, buses, input/output (I/O) circuits, and the like. The controller 116 may be implemented using a general purpose computer that, when executing particular software and/or firmware, becomes a specific purpose computer for performing various embodiments of the present invention. In other embodiments, the CPU 202 may be a microcontroller comprising internal memory for storing controller firmware that, when executed, provides the controller functionality described herein.

The memory 206 may comprise random access memory, read only memory, removable disk memory, flash memory, and various combinations of these and/or other types of memory. The memory 206 is sometimes referred to as main memory and may, in part, be used as cache memory or buffer memory. The memory 206 generally stores the operating system (OS) 208, if necessary, of the controller 116 that can be supported by the CPU capabilities. In some embodiments, the OS 208 may be one of a number of commercially available operating systems such as, but not limited to, LINUX, Real-Time Operating System (RTOS), and the like.

The memory 206 stores various forms of application software and/or firmware, such as a power conditioner control module 210 for controlling operation of the power conditioner 102 (e.g., DC-AC conversion, AC-DC conversion, communication, and the like) and a black-start module 114 for controlling, when executed, the power conditioner black-start functionality as described herein. Further detail on the functionality provided by the black-start module 114 is described below with respect to FIG. 3.

The memory 206 may additionally store a database 212 for storing data related to the operation of the power conditioner 102 and/or the present invention.

Figure 3:
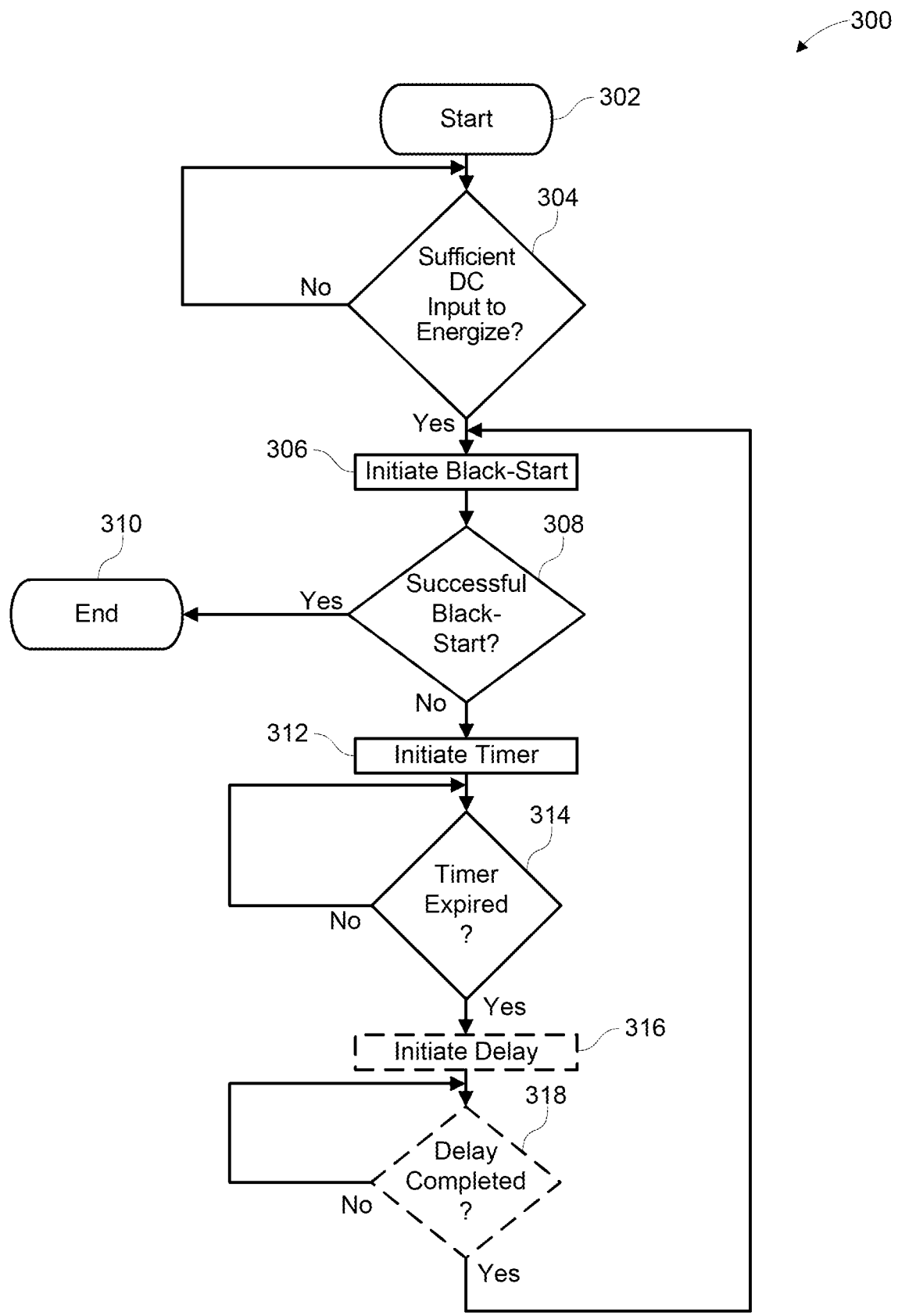
FIG. 3 is a flow diagram of a method for synchronizing decentralized start-up of grid-forming inverters in a distributed resource island system (DRIS) in accordance with one or more embodiments of the present invention.

FIG. 3 is a block diagram of a method 300 for synchronizing decentralized start-up of grid-forming inverters in a distributed resource island system (DRIS) in accordance with one or more embodiments of the present invention. The grid-forming inverters, which may be referred to as power conditioners, are part of a DRIS such as in the system 100 described above and are, at the start of the method 300, de-energized. Each of the power conditioners in the DRIS implements the method 300 for a decentralized black-start that addresses synchronization of timing and current direction for the power conditioners.

In various embodiments, the method 300 is an implementation of the black-start module 114 described above. In some embodiments, a computer readable medium comprises a program that, when executed by a processor (such as a processor described above), performs the method 300.

The method 300 begins at step 302 and proceeds to step 304. At step 304, a determination is made whether sufficient DC input is received by the power conditioner to transition from de-energized to an active grid, either at a soft-grid level or at nominal voltage. For example, the power conditioner may determine whether the received DC satisfies a threshold. If the result of the determination is no, the method 300 returns to step 304. If the result of the determination in yes, the method proceeds to step 306 where a black-start is initiated.

The method 300 proceeds to step 308, where a determination is made whether the black-start is successful. If the result of the determination is yes, that the black-start is successful, the method 300 proceeds to step 310 where it ends. If the result of the determination is no, that the black-start is not successful (i.e., the line voltage has collapsed to zero), the method 300 proceeds to step 312.

At step 312, a timer is started and the method proceeds to step 314. At step 314, a determination is made whether the timer has expired. If the result of the determination is no, the method 300 returns to step 314. If the result of the determination is yes, the method 300 proceeds to step 316.

At step 316, a delay is initiated in order to determine the necessary current polarity. The delay is a randomized delay based on a confidence score as described above with respect to FIG. 1. This extra delay provides sufficient time, prior to producing current, for observation of the polarity from other power conditioners in the DRIS. The delay may be, for example, up to half an AC mains cycle, although other levels of delay may be used.

The method 300 proceeds to step 318 where a determination is made whether the delay has completed. If the result of the determination is no, the method 300 returns to step 318; if the result of the determination is yes, the method 300 returns to step 306 to re-attempt the black-start. In one or more embodiments, the current polarity does not need to be determined (e.g., when the DRIS power conditioners have polarized connectors) and the method 300 proceeds directly from step 314 to step 306 to re-attempt the black-start.

While the foregoing is directed to embodiments of the present invention, other and further embodiments of the invention may be devised without departing from the basic scope thereof, and the scope thereof is determined by the claims that follow.

The invention claimed is:

1. A method for synchronizing decentralized power conditioner start-up in a distributed resource island system (DRIS), comprising:
   determining, by a power conditioner in the DRIS, when a line voltage of the DRIS collapses to zero;
   starting, by the power conditioner, when the line voltage collapses to zero, a black-start timer, wherein the black-start timer is set to the same amount of time as a plurality of black-start timers corresponding to a plurality of power conditioners of the DRIS; and
   initiating, by the power conditioner, following expiration of the black-start timer, a black-start.

2. The method of claim 1, further comprising:
   initiating, following the expiration of the timer and before initiating the black-start, a time delay.

3. The method of claim 2, wherein the time delay is a randomized time delay.

4. The method of claim 3, wherein the randomized time delay is based on a confidence score that indicates a confidence level in generating a particular polarity of current.

5. The method of claim 4, wherein the confidence score is adjusted based on at least one event observed, by the power conditioner, during ramp-up.

6. The method of claim 5, wherein the at least one event comprises at least one of a voltage from at least one other power conditioner of the DRIS, an unsuccessful ramp-up attempt, or a successfully completed ramp-up.

7. The method of claim 4, wherein a delay range for the randomized delay is inversely proportional to the confidence score.

8. The method of claim 7, wherein the delay range is zero when the confidence score is at its maximum value.

9. An apparatus for synchronizing decentralized power conditioner start-up in a distributed resource island system (DRIS), comprising:
   a controller for a power conditioner in the DRIS, wherein the controller comprises at least one processor and:
      determines when a line voltage of the DRIS collapses to zero;
      starts, when the line voltage collapses to zero, a black-start timer, wherein the black-start timer is set to the same amount of time as a plurality of black-start timers corresponding to a plurality of power conditioners of the DRIS; and
      initiates, following expiration of the black-start timer, a black-start.

10. The apparatus of claim 9, wherein the controller further initiates, following the expiration of the timer and before initiating the black-start, a time delay.

11. The apparatus of claim 10, wherein the time delay is a randomized time delay.

12. The apparatus of claim 11, wherein the randomized time delay is based on a confidence score that indicates a confidence level in generating a particular polarity of current.

13. The apparatus of claim 12, wherein the confidence score is adjusted based on at least one event observed, by the power conditioner, during ramp-up.

14. The apparatus of claim 13, wherein the at least one event comprises at least one of a voltage from at least one other power conditioner in the DRIS, an unsuccessful ramp-up attempt, or a successfully completed ramp-up.

15. The apparatus of claim 12, wherein a delay range for the randomized delay is inversely proportional to the confidence score.

16. The apparatus of claim 15, wherein the delay range is zero when the confidence score is at its maximum value.

17. A non-transitory computer readable medium comprising a program that, when executed by a processor, performs a method for synchronizing decentralized power conditioner start-up in a distributed resource island system (DRIS), the method comprising:

determining when a line voltage of the DRIS collapses to zero;

starting, when the line voltage collapses to zero, a black-start timer, wherein the black-start timer is set to the same amount of time as a plurality of black-start timers corresponding to a plurality of power conditioners of the DRIS; and initiating, following expiration of the black-start timer, a black-start of a power conditioner of the DRIS.

18. The non-transitory computer readable medium of claim 17, the method further comprising:

initiating, following the expiration of the timer and before initiating the black-start, a time delay.

19. The non-transitory computer readable medium of claim 18, wherein the time delay is a randomized time delay.

20. The non-transitory computer readable medium of claim 19, wherein the randomized time delay is based on a confidence score that indicates a confidence level in generating a particular polarity of current.

\* \* \* \* \*